C. H. SMITH.
GASIFICATION OF COAL AND OBTAINING OF BY-PRODUCTS.
APPLICATION FILED FEB. 16, 1918.
1,413,799.                              Patented Apr. 25, 1922.
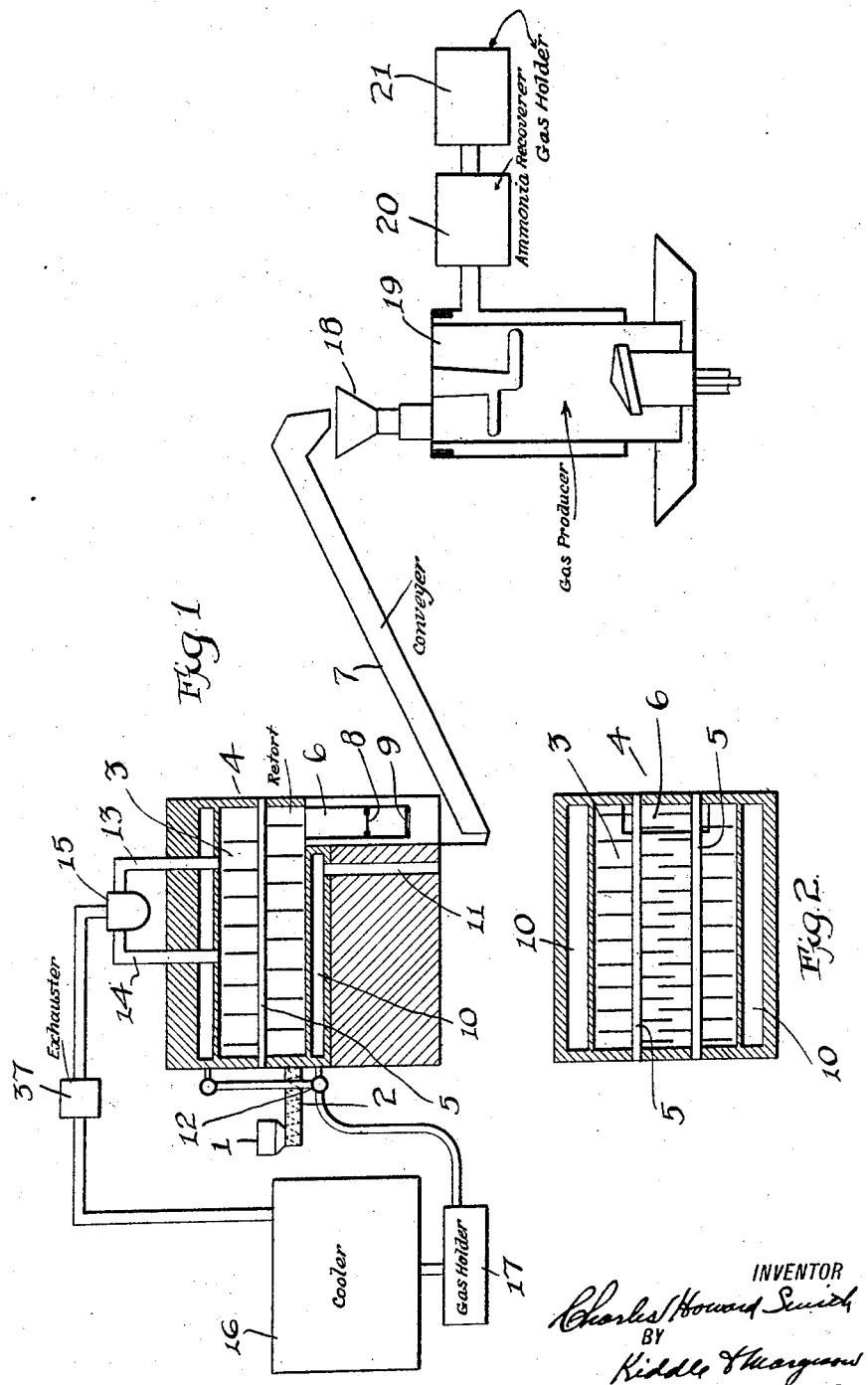

UNITED STATES PATENT OFFICE.

CHARLES HOWARD SMITH, OF SHORT HILLS, NEW JERSEY, ASSIGNOR TO INTERNATIONAL COAL PRODUCTS CORPORATION, OF RICHMOND, VIRGINIA, A CORPORATION OF VIRGINIA.

GASIFICATION OF COAL AND OBTAINING OF BY-PRODUCTS.

1,413,799.     Specification of Letters Patent.     Patented Apr. 25, 1922.

Application filed February 16, 1918. Serial No. 217,469.

*To all whom it may concern:*

Be it known that I, CHARLES HOWARD SMITH, a citizen of the United States, and a resident of Short Hills, in the county of Essex and State of New Jersey, have made certain new and useful Improvements in the Gasification of Coal and Obtaining of By-Products, of which the following is a specification.

The invention relates to the treating of raw coals of a caking or swelling type and the subsequent utilization of the treated coals.

The invention has as an object the utilization in a gas producer of caking or swelling coals, which producer according to the invention is preferably of the by-product recovery type.

The invention is particularly directed to the treatment of coals that cake or swell when heated and to the subsequent utilization of the treated residue. There are certain raw coals—notably certain caking coals—the employment of which in a gas producer is accompanied by objectionable features hereinafter more fully pointed out, and an object of the present invention is to subject such coals to a preliminary heating or partial distillation whereby the resulting residue is made substantially tarless and can be employed without encountering objectionable features, particularly, such as caking and swelling.

The by-product gas producer as known in the arts and as the term is herein employed is an apparatus in which a charge of coal or other hydrocarbon solid fuel is employed in a manner to permit a burning in a portion of the charge, usually at or adjacent to lower portion which portion of the charge is in the form of an incandescent bed that is continuously maintained incandescent as the producer is operated and in a manner whereby an unburned upper portion of the charge is continuously maintained as a covering or blanket over the incandescent mass or bed. Air is continuously fed into the incandescent mass and in the passage of the air through the incandescent mass much if not all of the oxygen in the air unites with carbon in the charge or mass thus forming carbon dioxide leaving nitrogen. In other words, the air thus supplied supports the combustion which takes place in the incandescent portion of the charge. The heat from the incandescent mass causes hydrocarbons and other vapors or gas to be evolved from the upper portion of the charge, this due to the action of the heat on the organic substances therein, and much of the hot $CO_2$, dependent upon the manner in which the gas producer is being operated, is converted into or reduced to $CO$ passing through the upper portion of the charge.

Water gas producers may also be utilized in this art. In producers of this type the coal is alternately brought to an incandescent state by air that is supplied thereto and is cooled at successive intervals by steam which is injected into the incandescent carbonaceous material. The steam is broken up by the incandescent mass with the result that hydrogen is given off and oxygen is supplied which ultimately becomes a part of the carbon monoxide that is found in the resulting gas. The resulting gas is commonly known as water gas.

It will here be remarked that in many producers it is customary to employ a steam injector as means for forcing air into the lower portion of the charge within the producer and in this way the air and a desired amount of steam are supplied. From a gas producer the ashes resulting from the burning of the charge can be removed as they collect and the operation of the producer is continuous or intermittent, dependent upon the particular type of producer in which the gas is made.

It will be seen from what has preceded that a gas producer may be referred to broadly as an apparatus in which a portion of the charge is burned in order to supply heat to effect the desired conversion of the charge into combustible gases and this is true whether the producer is what is known as the ordinary by-product gas producer or what is known as the water gas producer.

Previous gas producer practice has demonstrated that in producers, coals of the caking type pass through a stage in their gasification of apparent fusion during which they swell materially and cake and block or retard the free passage of the air, steam and gases through the producer, and also form a bridge or arch within the producer thus interfering with the constant downward passage of the charge which is a necessary operation of the process. It is during this same swelling and caking period that the tar vapors are largely given off by the coal. Therefore, by the preliminary removal of these vapors a proper fuel for the by-product gas producer can be realized. The desired fuel should be uniform in character, should be susceptible to rapid gasification and should be non-swelling, but should contain a high percentage of combined nitrogen upon which the yield of ammonia is dependent.

As the gasification is accompanied by the blowing of—or suction of—air and also usually of steam into the bed of the fuel there necessarily results a sufficiently high draft to carry upward fine dust or particles of the charge together with particles of ash. These particles consequently become suspended in the product of distillation and are delivered from the producer along with the gases and vapors. If an attempt is made to recover and refine the tar products from such distillation difficulties will be encountered in the ultimate refining attempted in the still because of the large percentage of impurities in the form of solid particles of dust and ash. It is therefore evident that tars containing these impurities are of a materially inferior grade and of less value than a green or untreated tar in which these impurities are not present.

It will also be noted as has been heretofore pointed out that in the gasifying of raw coal, that is of certain high volatile coals and particularly those of a caking type, there is a swelling and caking of the fuel within the retort in a manner to detrimentally affect both the operation of the retort and the subsequent gas derived from the retort; in other words, the producer will be "slow" and the gas given off will be of poor quality with an undue percentage of $CO_2$.

According to the present invention I subject the raw coal to the preliminary heating previously referred to having in view as one object the removing of most, if not all, of the tar vapors from the coal before the coal residue is inserted in the gas producer. This preliminary heat treatment is not carried out at sufficiently high temperatures to materially reduce the nitrogen content of the coal hence most of the ammonia products are still recoverable as by-products from the gas producer wherein the temperatures are much higher than in the retort where the preliminary heating is carried out.

In the gasification of coal the vapor point of the tar is relatively low. The transmission of heat throughout the mass progresses slowly due to the heat insulating properties of the tar and, furthermore, following the well known laws of fusion, each portion of the mass could not be heated above the fusion point of the tars until the tars in the particular portion of the mass have been converted into gaseous and vaporous conditions. Hence, each portion of the mass remains at a relatively low temperature for a considerable part of the total period required for the complete gasification thereof. During the tar vaporization period the mass or the several portions thereof passes or pass through the swelling and plastic stage which causes the objectionable features encountered in utilizing caking or swelling coals in gas producers.

Following the elimination of the tar providing material in each portion of the mass the residue of each portion from which the tar has been removed is then in a soft, porous and non-caking condition, but each portion of the mass immediately after the removal of the tar therefrom starts to rise to higher temperatures and becomes incandescent.

According to my process I agitate or mix the coal while subjecting it to a relatively low temperature treatment, thus removing the tar vapors and rich gases under conditions favorable to the recovery of clean valuable tars and also producing a uniform partially carbonized residue substantially free of tars, thereby avoiding the difficulties and objectionable features incident to the caking or swelling previously outlined.

The present invention contemplates a preliminary heat treatment of coal in order to eliminate a substantial portion of the volatile content thereof, to wit, a part of the volatile content which produces tar vapors, the recovery of the tar vapors, the subsequent insertion of the resulting coal residue into a by-product gas producer, the conversion in the producer of the carbonaceous portions of the coal residue into gas, and the recovery of ammonia as a by-product from the gas from the producer.

The invention is particularly adapted to the treatment of raw caking or swelling coals in order to remove a substantial portion of that part of the volatile content that gives off the tar vapors, the production of a residue which can be used in a by-product gas producer, and the subsequent use of said residue in such by-product gas producer.

More specifically, the invention is directed to the preliminary partial carbonization of said caking or swelling coals by subjecting them to a relatively low heat treatment, for example, at temperatures ranging approximately from 800 degrees F. to 950 degrees F. such carbonization distillation being carried out in a manner to remove the volatile content of the coals which give off the tar vapors, the condensing of the tar vapors so as to obtain tar as a by-product from said preliminary treatment, and the subsequent gasification of the residue under higher temperature conditions (for example, approximately 1500 degrees F. or even higher) so as to obtain ammonia derivable from gases that are formed within the gas producer and that are not formed at the lower temperature of the preliminary treatment.

Reference is now made to the accompanying drawing forming a part of this specification in which drawing, Figure 1 illustrates diagrammatically an apparatus or plant wherein the invention may be performed; and Figure 2 is a diagrammatic view, in horizontal section, of the furnace retort employed in the apparatus or plant shown in Figure 1.

In carrying out the invention coal of the caking or swelling type is preferably first crushed in any suitable manner—if not already in a finely divided condition. This crushed or finely divided coal is placed in a hopper 1 and is fed by a screw-conveyer 2 or other suitable automatic conveying means into the retort or oven 3 of the furnace retort 4. The retort or oven 3 has therein any suitable mixing and conveying means 5 as, for example, two parallel shafts carrying paddles, which shafts are arranged so that the paddles on one shaft overlap the paddles on the companion shaft as the shafts rotate. These paddles serve to move the coal charged to the interior of the retort progressively along the retort from the charging end thereof to the discharging end and at the same time they mix and agitate the mass thus conveyed. The residue or partially carbonized coal is delivered through the discharge conduit 6 upon a conveyer or conveying mechanism 7. This discharge conduit 6 is provided with any suitable sealing means, as movable gates 8 and 9, whereby the coal residue from the retort or oven 3 can pass through the discharge conduit of the conveyer without allowing the admission of a substantial amount of air into the interior of the retort.

The furnace retort 4 is surrounded by a combustion chamber, or a series of combustion chambers or flues, as 10, that serves to provide the means for heating the retort 3. The products of combustion pass from the furnace through a common passageway or waste gas flue 11. The fuel supply to the interior of the combustion chamber 10 may be supplied as through piping 12. The coal charged to the retort is subjected to a uniform mixing and progressive heating up to temperatures approximating, for example, 800 degrees F. to 900 degrees F., for approximately one hour, more or less, or until there results the particular type of coal residue desired. At that time the treated coal has lost its caking or swelling characteristics; in short, the heating of the caking or swelling coal should be carried out until this is accomplished. The temperature at which the coal within the retort is heated and the period for which it is heated are dependent to a large extent upon the character of the coal charged to the retort and the final residue desired; also upon the percentage of the tar vapors it is desired to remove from the coal prior to the introduction of the coal residue into the gas producer.

During this heating or carbonizing operation, which is frequently referred to as the preliminary heat treatment or preliminary distillation operation, moisture and volatile matter in the coal are driven off and pass from the furnace-retort in the form of gases and vapors, as through pipes 13 and 14, to the hydraulic main 15. From the hydraulic main 15 the gases pass through gas cooling and purifying apparatus 16 which also serves as a tar recovering apparatus. This purifying apparatus 16, as just indicated, may be relied upon to condense any tar vapors contained in the gases whereby the tar can be recovered. The exhauster 37 is employed to assist in removing the gases and vapors and forcing them through the gas cooling and purifying apparatus. After purification and cooling the gases pass to the holder 17 from which any part of these uncondensable gases can be supplied through the piping 12 as a fuel for heating in the combustion chamber or chambers 10. The coal residue passing from the retort is delivered as by a conveyer 7 into a hopper 18 and finally delivered into a by-product gas producer 19. This gas producer is equipped with suitable apparatus to cool and collect the products of gasification, i. e., ammonia in liquid form at 20 and the permanent gases in the holder 21. The temperatures within the producer are higher than those of the preliminary distillation and it will here be noted that the temperature within the producer is sufficient to convert the nitrogen content of the coal into the ammonia gases. The temperatures of the preliminary distillation were not sufficiently high, however, to effect this conversion of the nitrogen content of the coal, the required temperature for this purpose being approximately 1500 degrees F. to 1800 degrees F.

We have found that the carbon residue from the low temperature or initial distillation contains most of the original nitrogen content of the raw coal, i. e., a coal having an original nitrogen content of 1.52%, and a volatile content of 34% after having been passed through the primary distillation or carbonization has a carbon residue with a nitrogen content of 1.76% thereof while the volatile was reduced by such carbonization to less than 10% of the residue, thereby showing that an actual concentration of the nitrogen content is effected or realized by said primary distillation.

The charging of the partially distilled residue derived from the initial heating—which residue it will be noted is a soft, porous, non-metallic form of carbon, viz. a residue non-metallic in appearance, practically free from tar—when fed into the producer either at ordinary atmospheric temperature or while heated as when delivered from the retort, provides a material capable of a much higher rate of gasification in the by-product producer than the raw coal from which it was made, and for this reason a materially increased capacity can be attained in the gas producer.

It will therefore be noted that the above process recovers the maximum yield of tar and tar products in their most valuable form in the primary distillation, combined with a full yield of ammonia derivable from the producer operation, together with a substantial yield of gas which can be utilized for various purposes. The charging of the partially distilled residue—that is a carbonized coal residue—into a gas producer overcomes any caking or swelling which would otherwise be encountered if the raw coals from which the residue is made were charged directly into the producer.

The invention is, as previously indicated, directed to the treatment and employment of coals of the caking or swelling type and to the recovery of clean tar products and ammonia products, as by-products, and the invention particularly relates to the treatment of such caking or swelling coals to render the same in a condition suitable for use in a gas product and to the subsequent use of the treated residue in a by-product gas producer.

The improvements herein set forth are not limited to the precise construction and arrangement shown and described for they may be embodied in various forms and modifications without departing from the spirit and scope of the invention.

What I claim is:

1. The process of recovering ammonia and tar separately in the distillation of caking or swelling coal and the production of water gas or producer gas therefrom, consisting in subjecting finely divided coal to partial distillation at temperatures below a point where substantial quantities of ammonia pass off, while continuously agitating the coal, withdrawing substantially all the vapors, gases and tars driven off during said distillation, treating the uniform coal residue of said partial distillation in a by-product gas producer at considerably higher temperatures, and separately recovering the ammonia which passes out of said producer along with the producer gas or water gas formed therein.

2. The process of recovering ammonia and tar separately in the distillation of caking or swelling coal and the production of water gas or producer gas therefrom, consisting in subjecting finely divided coal to partial distillation at temperatures below a point where substantial quantities of ammonia pass off, while continuously agitating the coal, continuing the heating until the coal loses its caking or swelling properties, withdrawing substantially all the vapors, gases and tars driven off during said distillation, treating the uniform coal residue of said partial distillation in a by-product gas producer at considerably higher temperatures, and separately recovering the ammonia which passes out of said producer along with the producer gas or water gas formed therein.

3. The process of recovering ammonia and tar separately in the distillation of caking coal or swelling coal and the production of water gas or producer gas therefrom, consisting in subjecting the coal in finely divided form to partial distillation at temperatures approximately from 800 degrees F. to 950 degrees F. while continuously agitating and mixing the coal, withdrawing substantially all the vapors, gases and tars given off during said distillation, continuing the heating until the coal looses its caking or swelling properties, treating the resulting partially distilled coal residue in a gas producer at considerably higher temperatures, and separately recovering the ammonia which passes out of said producer along with the gas formed therein.

4. The method which consists in heating caking or swelling coal, while continuously agitating and mixing the same, to remove volatile matter that is driven off as tar vapors and to produce a uniform partially carbonized residue which will not take or swell, the heating being below the temperatures where substantial quantities of ammonia pass off and being continued until the coal loses its caking or swelling properties, collecting the vapors and recovering the by-products therefrom, transferring said uniform partially carbonized residue to a gas producer and therein gasifying said residue, and recovering ammonia from the gaseous products derived from said residue.

5. The method which consists in heating caking or swelling coal, while continuously agitating and mixing the same, to a temperature of approximately 800 degrees F. to 950 degree F. to eliminate the volatile matter which will volatilize at said temperatures and leave a uniform but partially distilled residue which has lost its caking or swelling properties, condensing the condensable vapors thus given off, charging the partially carbonized residue into a gas producer and therein subjecting said residue to a gasifying operation, and recovering ammonia from the gas given off by said producer.

This specification signed and witnessed this 14th day of February, A. D. 1918.

CHARLES HOWARD SMITH.

Signed in the presence of—
G. McGRANN,
JOSEPH MONTGOMERY.